United States Patent [19]

Stodolka

[11] Patent Number: 4,597,803
[45] Date of Patent: * Jul. 1, 1986

[54] PROCESS FOR CLEANING VESSELS CONTAINING SULFUR DICHLORIDE

[75] Inventor: Mark J. Stodolka, Sanborn, N.Y.

[73] Assignee: Occidental Chemical Corporation, Niagara Falls, N.Y.

[ * ] Notice: The portion of the term of this patent subsequent to Oct. 8, 2002 has been disclaimed.

[21] Appl. No.: 742,839

[22] Filed: Jun. 10, 1985

Related U.S. Application Data

[63] Continuation-in-part of Ser. No. 602,564, Apr. 20, 1984, Pat. No. 4,545,822.

[51] Int. Cl.$^4$ .................................................. B08B 9/08
[52] U.S. Cl. ........................................ 134/10; 134/19; 134/21; 134/22.1
[58] Field of Search .................. 134/8, 10, 19, 21, 22.1

[56] References Cited

U.S. PATENT DOCUMENTS

| | | | |
|---|---|---|---|
| 1,849,932 | 3/1932 | Johnson et al. | 134/19 X |
| 3,163,134 | 12/1964 | Stratford | 134/19 X |
| 4,136,624 | 1/1979 | Kato et al. | 134/19 X |
| 4,220,480 | 9/1980 | Dwan | 134/19 X |
| 4,332,626 | 6/1982 | Hood et al. | 134/19 X |
| 4,545,822 | 10/1985 | Stodolka | 134/10 |

*Primary Examiner*—Arthur L. Corbin
*Attorney, Agent, or Firm*—James F. Tao; William G. Gosz

[57] ABSTRACT

A process for cleaning vessels containing liquid sulfur dichloride is disclosed. The sulfur dichloride is first removed from the vessel leaving a heel (residue) of liquid and solid material on the bottom of the vessel. The remaining liquid is vaporized by heating the vessel, and the vapors are removed by vacuum and purging, and neutralized by reaction with a basic solution. The vessel is purged with a dry inert gas during heating to prevent exothermic reactions and the formation of toxic reaction products, and to assist in removal of vapors from the vessel. The solid residue remaining in the vessel is then removed from both the bottom and wall portions. In a preferred aspect, the present invention is particularly applicable to cleaning railroad tank cars which are used to transport sulfur dichloride.

16 Claims, No Drawings

PROCESS FOR CLEANING VESSELS CONTAINING SULFUR DICHLORIDE

BACKGROUND OF THE INVENTION

The present invention is directed to an improved process for cleaning vessels containing sulfur dichloride. In the process of this invention, substantially all of the liquid sulfur dichloride is first removed from the vessel, and the material remaining in the vessel, including a slurry of liquid and solid material on the bottom, is heated in the presence of an inert gas to vaporize liquid components. The vapor is removed from the vessel by vacuum supplemented by the inert gas purge, neutralized, and the solid residue, primarily $FeCl_3$, is then removed from the bottom of the vessel.

Sulfur dichloride, $SCl_2$, is used extensively in the manufacture of organic chemicals and insecticides, as a vulcanizing agent for rubber, as a reagent, and as a lubricant additive. It is a brownish red liquid at room temperature which boils at about 60° C. It spontaneously decomposes to form sulfur monochloride and chlorine at elevated temperatures.

Sulfur dichloride is conventionally prepared by the liquid phase chlorination of sulfur monochloride in the presence of a Lewis-acid catalyst such as $FeCl_3$. Typical methods of preparation are disclosed in U.S. Pat. No. 3,219,413 to Kunkel et al. and U.S. Pat. No. 3,205,040 to Schmadebeck.

Sulfur dichloride is commercially shipped in liquid form in steel railroad tank cars. The sulfur dichloride is removed from the tank car through an opening in the top of the car leaving a mixture of liquid sulfur dichloride and solid material on the bottom of the tank car. This solid material is primarily ferric chloride with smaller amounts of ferrous chloride and ferrous sulfide. A residue of this solid material also coats the internal surfaces or walls of the tank car. Following normal shipping practice, only the sulfur dichloride is removed, and the tank car is then put back into service.

Vessels such as tank cars must be periodically static pressuretested for leaks to meet regulatory requirements and to insure safe operating conditions. Prior to such testing, the vessel must be completely cleaned of reactive materials. Present cleaning techniques involve the addition of water or aqueous solutions of sodium hydroxide to the vessel. The water or sodium hydroxide solution reacts with the sulfur dichloride to form hydrochloric acid, chlorine, sulfur and sulfur dioxide. These reaction products are, in general, less reactive and easier to handle than sulfur dichloride. Hydrochloric acid, which is the primary reaction product, can be neutralized with additional sodium hydroxide and safely removed from the vessel.

This procedure is subject to numerous disadvantages. The reaction of water or an aqueous sodium hydroxide solution with the contents of the vessel is strongly exothermic and forms gaseous reaction products (HCl and $SO_2$). These reactive gases are produced at a rapid rate which is not easily controllable. In addition, since the reaction is exothermic, the temperature inside the vessel can increase dramatically and cause a substantial pressure build-up. These reaction products are also highly corrosive and cause severe corrosion to the internal surface of the vessel.

Consequently, it is desirable to develop an improved process for cleaning vessels containing sulfur dichloride which is safer and more convenient than previous cleaning methods.

SUMMARY OF THE INVENTION

In accordance with the present invention, an improved process is provided for cleaning vessels containing sulfur dichloride. Substantially all of the liquid sulfur dichloride is first removed from the vessel leaving solid material wetted with sulfur dichloride on the bottom. The contents of the vessel are then heated in the presence of an inert gas to vaporize the liquid remaining in the vessel leaving a solid residue. The vapor is pumped from the vessel and neutralized by reaction with a base, and the solid residue is removed from the bottom of the vessel. Heating the vessel can be conveniently accomplished by covering the vessel with a blanket of insulating material and blowing a stream of hot air against the side or bottom of the vessel. Alternatively, atmospheric steam can be substituted for hot air, and polyethylene sheeting can be used as insulation.

The cleaning process of this invention has been found to be highly efficient and convenient since it avoids many of the problems encountered with previous cleaning techniques which directly comingle water or aqueous solutions of sodium hydroxide, such as the generation of corrosive reaction products within the vessel, and gas pressure and emission problems.

DESCRIPTION OF THE PREFERRED EMBODIMENTS

The cleaning process of the present invention is broadly applicable to a wide variety of vessels which are suitable for containing sulfur dichloride. Such vessels are usually fabricated from steel and contain an inner lining or coating which forms from the reaction of sulfur dichloride with the steel. This inner coating which comprises primarily iron chlorides serves as a passivation layer preventing further corrosion of the internal steel surface.

While the present invention finds particular applicability to railroad tank cars which are the primary transportation mode for sulfur dichloride, other vessels encompassed within the scope of this invention include storage tanks, reactors and mixing equipment, tank trucks and ships. For the sake of simplicity, however, specific features of this invention are described in connection with railroad tank cars. This should not be construed as an intent to limit the broad scope of the invention.

Prior to commencing the cleaning process of the present invention, it is first necessary to remove as much of the free liquid sulfur dichloride as is practicable from the bottom or heel of the tank car. This can be conveniently accomplished by inserting a metal or plastic tube into the car to a point below the liquid level, and applying a vacuum source to the other end of the tube. The vacuum source must be sufficient to draw the liquid from the bottom of the car into a receptacle. A suitable vacuum source for this purpose is a portable vacuum truck. A receiving vessel to contain the liquid material and a scrubber containing a basic solution such as an aqueous solution of sodium hydroxide can be placed in the circuit between the vacuum source and the tank car.

As liquid sulfur dichloride is drained from the car, it flows into a receiver. The liquid sulfur dichloride, which can contain some dissolved chlorine, is primarily isolated in the receiver. Vapors and droplets are conveyed under vacuum to the scrubber. Chlorine and any sulfur dichloride contained in the liquid are neutralized in the scrubber by reaction with a suitable base such as sodium hydroxide, potassium hydroxide, calcium hydroxide, etc. The expression "neutralized" as used in this specification and appended claims is intended to denote the reaction of liquid or gaseous materials from the vessel with a basic material.

After removal of the free liquid sulfur dichloride on the bottom of the car, residual liquid sulfur dichloride remaining in the car can then be removed by vaporization. The residual sulfur dichloride is present as a surface film on the car walls and as a heel of liquid mixed with solid material on the bottom of the car. This heel also contains a solid comprising primarily particles of ferric chloride, and a small amount of ferrous chloride, ferrous sulfide and other solid iron salts. These solids remain on the bottom and walls of the car after the vaporization of liquid material is complete.

Vaporization of the liquid sulfur dichloride remaining in the car is conveniently accomplished by heating the external surface of the car using either a hot air blower system or atmospheric steam. The hot air blower can consist of one or more turbine heaters or a propane heater which directs a stream of hot air against the side of the tank car. Steam can be delivered through a pipe with openings directed at the bottom of the vessel. In order to minimize heat loss and distribute heat evenly, the entire tank car can be covered with a sheet of insulating material. A flexible fiberglass blanket can be used with a hot air system, or a polyethylene sheet can be used with steam.

It is necessary to raise the internal temperature of the vessel to at least about 50° C. and preferably to at least about 100° C. to insure complete vaporization of the liquid in the vessel. Because the gaseous products evolved during vaporization are reactive in air, and a gas sweep can serve to facilitate vapor carry-over, a continuous stream of dry inert gas is supplied to the vessel. The inert gas is preferably nitrogen due to economic considerations, but in general any dry inert gas is suitable for this purpose. As an alternative heating procedure, the inert gas can be preheated to a temperature sufficient to effect the desired vaporization of liquid components.

The vapors or fumes which evolve from the tank car can be removed by means of a vacuum which can be supplied by a portable vacuum truck connected to the top of the tank car by a flexible hose. The vapor can then be condensed and neutralized by contact with a basic solution such as a solution of sodium hydroxide. Other bases which are operable in this invention include, for example, potassium hydroxide and calcium hydroxide. Condensation and neutralization can be accomplished by providing a scrubber in the circuit between the heated car and the vacuum truck, or by simply drawing the heated vapors through a caustic solution contained in the vacuum truck.

Once the remaining liquid has been vaporized, the surface of the vessel is allowed to cool to ambient temperature. It is then possible to remove the solid material remaining on the bottom of the car. This can be accomplished by a worker who enters the car and physically scrapes loose material from the bottom and walls of the car. The solid material can also be conveniently removed using a vacuum system such as vacuum truck.

After completing removal of the solid material, the cleaned car is ready for hydrostatic testing. Following hydrostatic testing, the tank car can be placed back into service.

Although various embodiments of this invention have been shown and described in the specification, this invention is intended to be construed liberally and not limited to any specific embodiments as will be readily appreciated by those skilled in the art. It is to be understood, therefore, that the appended claims are intended to cover all modifications and variations which are with the spirit and scope of the present invention.

What is claimed is:

1. A process for cleaning vessels containing liquid sulfur dichloride comprising the steps of:
    (a) removing substantially all of the liquid sulfur dichloride from the vessel leaving a solids-containing liquid slurry on the bottom of the vessel,
    (b) heating the contents of the vessel in the presence of an inert gas to a temperature sufficient to vaporize the liquid remaining in the vessel leaving a solid residue,
    (c) removing the vapor from the vessel by vacuum,
    (d) neutralizing the vapor, and
    (e) removing the solid residue from the bottom of the vessel.

2. The process of claim 1 wherein the liquid sulfur dichloride is removed from the vessel by vacuum.

3. The process of claim 2 wherein the liquid sulfur dichloride is neutralized after removal from the vessel.

4. The process of claim 3 wherein the liquid sulfur dichloride is neutralized by reaction with sodium hydroxide.

5. The process of claim 1 wherein the solid residue comprises ferric chloride.

6. The process of claim 1 wherein the vessel is heated using an external heating source 7. The process of claim 6 wherein the vessel is insulated during heating.

8. The process of claim 7 wherein the external heating source is hot air and the insulation is provided by a fiberglass blanket.

9. The process of claim 7 wherein the external heating source is steam and the insulation is provided by a polyethylene sheet.

10. The process of claim 1 wherein the vessel is heated to at least about 50° C.

11. The process of claim 10 wherein the vessel is heated to at least about 100° C.

12. The process of claim 1 wherein the inert gas is nitrogen.

13. The process of claim 1 wherein the vapor is neutralized after removal from the vessel.

14. The process of claim 13 wherein the vapor is neutralized by reaction with sodium hydroxide.

15. The process of claim 13 wherein the vapor is neutralized by reaction with calcium hydroxide.

16. The process of claim 1 wherein the vessel is a railroad tank car.

* * * * *